Aug. 1, 1950
H. G. SHRIVER
2,517,359
DUAL WHEEL RUNNING GEAR AND EQUALIZER
SUPPORT THEREFOR
Filed May 27, 1947
2 Sheets-Sheet 1
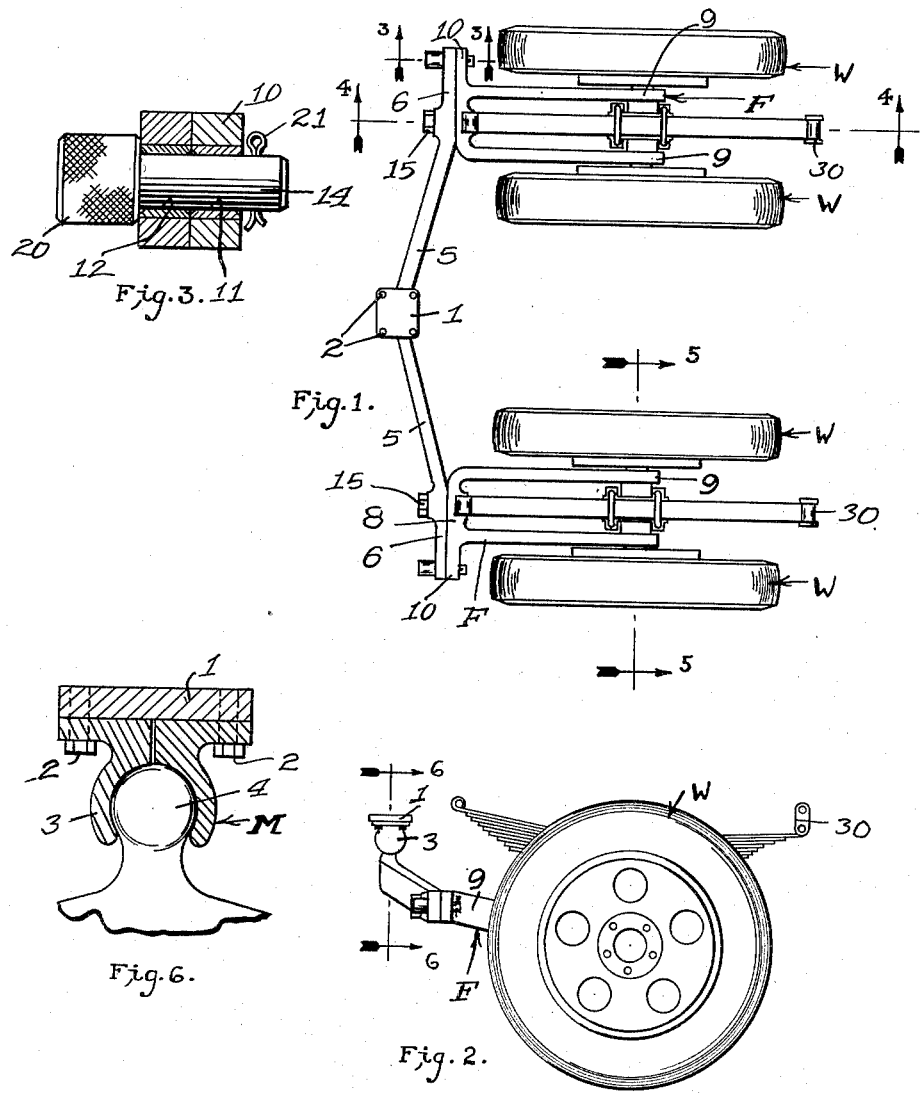
INVENTOR
Harry G. Shriver
BY
Wilfred E. Lawson
ATTORNEY Aug. 1, 1950         H. G. SHRIVER         2,517,359
       DUAL WHEEL RUNNING GEAR AND EQUALIZER
                    SUPPORT THEREFOR
Filed May 27, 1947                    2 Sheets-Sheet 2

INVENTOR
*Harry G. Shriver*
BY
*Wilfred E. Lawson*
ATTORNEY

Patented Aug. 1, 1950

2,517,359

UNITED STATES PATENT OFFICE 2,517,359

DUAL WHEEL RUNNING GEAR AND EQUALIZER SUPPORT THEREFOR

Harry G. Shriver, Wichita, Kans.

Application May 27, 1947, Serial No. 750,697

5 Claims. (Cl. 280—112)

This invention relates to a running gear and it is a particular object of the invention to provide a means to equalize the load on each individual wheel where dual wheels are used under tandem trailers and in a manner to give the effect of individual wheel suspension.

It is also an object of the invention to provide an assembly of this kind wherein in the event of tire failure, the inflated tire of the associated wheel will readily carry the entire load.

It is also an object of the invention to provide a gear which is so constructed as to make the same particularly advantageous in travel over rough surfaces such as fields when hauling oil, poles or the like, and in a manner wherein shock is materially eliminated and liability of bruising of the tires substantially avoided.

A still further object of the invention is to provide a running gear which will readily compensate for the crown of the roadway in order to more effectively distribute the tire load.

In order that my invention may be better understood, I will now proceed to describe the same with reference to the accompanying drawing, wherein:

Figure 1 is a view in top plan of a running gear constructed in accordance with an embodiment of the invention;

Figure 2 is a view in side elevation of the structure as illustrated in Figure 1;

Figure 3 is a detail sectional view taken substantially on the line 3—3 of Figure 1;

Figure 6 is an enlarged fragmentary sectional view taken substantially on the line 6—6 of Figure 2.

Figure 4:
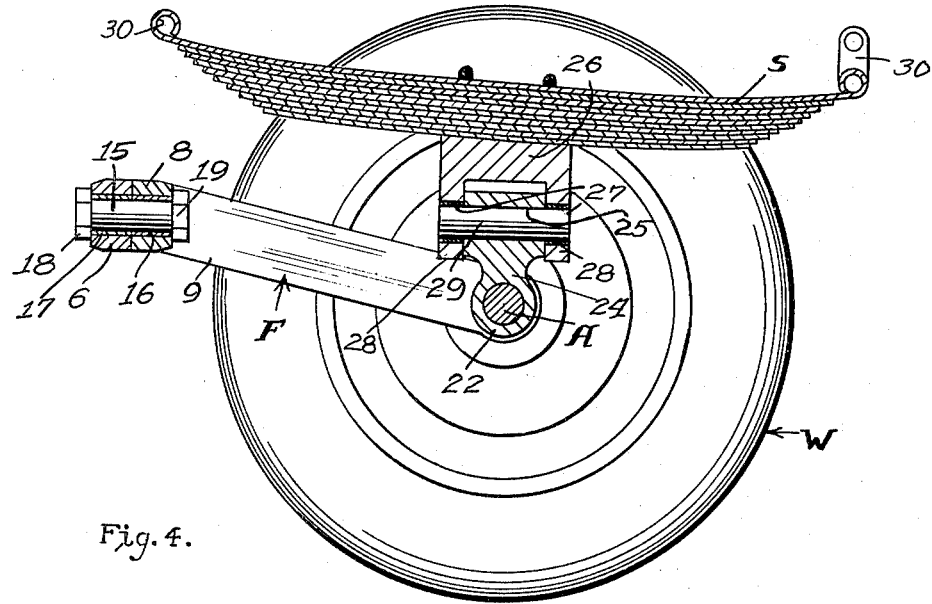
Figure 4 is an enlarged detail sectional view taken substantially on the line 4—4 of Figure 1.
Figure 5:
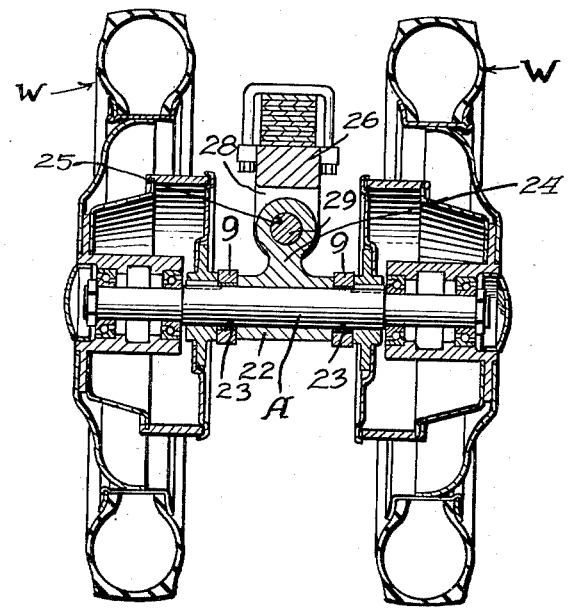
Figure 5 is an enlarged detail sectional view taken substantially on the line 5—5 of Figure 1.

In the embodiment of the invention as illustrated in the accompanying drawings, I denotes a plate adapted to be effectively secured to the under surface of the body of a trailer or other vehicle, and which has secured thereto by the bolts 2 or the like, the duplicate sections 3 of a socket member M which is adapted to receive and have operatively engaged therein the substantially spherical head 4 extending upwardly from substantially the center of the transversely disposed bolster 5.

This bolster 5 as herein embodied, extends from its longitudinal center downwardly and slightly rearwardly on a predetermined angle and terminating in the outwardly directed coplanar arms 6.

To the inner portion of each of the arms 6 is pivotally held by a bolt 15, the intermediate portion 8 of a fork F comprising the suitably spaced parallel and elongated arms 9, disposed on a predetermined downward rearward incline as particularly illustrated in Figures 2 and 4.

The intermediate portion 8 of each of the forks F is continued by an outwardly disposed short arm 10 provided with an opening 11 registering with an opening 12 in the said arm 6. Insertable through the registering openings 11 and 12 is a locking or holding pin 14 whereby the fork F is held against rocking movement upon its pivot bolt 15. This pivot bolt 15 is disposed through an opening 16 in the central part of the intermediate portion 8 of the fork and also through a registering opening 17 in the arm 6.

The bolt 15 is provided at one extremity with a head 18 and fitting upon its opposite extremity is a holding nut 19 of a conventional type.

The pin 14 is readily removable or insertable as desired, and to facilitate such operation, one extremity of the pin 14 carries a head 20 while insertable through the opposite end portion of the pin 14 is cotter key 21 or the like, whereby the pin 14 is held against accidental removal or displacement.

Snugly fitting between the outer or free end portions of the arms 9 of each of the forks F is a hub sleeve 22, the bore of which registers with the openings 23 provided in the free extremities of the arms 9. Disposed through the hub sleeve 22 and the openings 23 is an axle A of a length to extend at each end a desired distance beyond and outwardly of the fork arm 9 and upon each extended end of the axle A is mounted the ground engaging wheel W herein disclosed as of a pneumatic type.

Each of the sleeves 22 in its central portion is provided with an upstanding boss 24 having disposed therethrough an opening 25 at right angles to the bore of the sleeve 22. Straddling the boss 24 from above is a bolster 26 having depending arms 28 having openings 27 registering with the opening 25 of the boss 24. Through these openings 27 and 25 is disposed a pivot pin 29, which is suitably fixed to the arms 28. The bolster 26 is carried centrally of a leaf type of spring S, the extremities of which carry the shackles 30 whereby the spring S may be operatively engaged from below with the body of a trailer or other vehicle.

In view of the foregoing it is to be noted that the running gear is of the dual wheel type and is one whereby the load on each pair of wheels is effectively equalized to give the effect of individual wheel suspension.

To insure the wheels W having the desired castering action, the bolster or cross member 5 is operatively coupled at its central portion with the body of the vehicle by the previously described ball and socket joint.

Normally the pins 14 are not in use but in the event that there is tire failure of one of the wheels of a dual set a pin 14 is inserted, after the necessary jacking up of the parts to bring the openings 11 and 12 back to alignment, to lock the fork carrying such wheel against pivotal movement about the pin 15. This will insure the inflated remaining tire carrying the entire load.

From the foregoing description it is thought to be obvious that a running gear constructed in accordance with my invention is particularly well adapted for use by reason of the convenience and facility with which it may be assembled and operated.

I claim:

1. Vehicle body supporting running gear, comprising a bolster body, means for coupling the same with the under side of the vehicle body to extend transversely of the latter, a fork at each end of the bolster body, each fork comprising two spaced arms and a connecting intermediate portion, means securing the intermediate portion of each fork to the adjacent end of the bolster body, an axle supported by and extending across between and beyond the outer sides of the arms of each fork adjacent to the end of the fork remote from the bolster body, a pair of wheels rotatably mounted on each axle with the adjacent fork arms between them, and a vehicle body supporting spring mounted upon each axle between the fork arms.

2. Vehicle body supporting running gear of the character stated in claim 1 wherein the said connecting means between the intermediate portion of each fork and the adjacent end of the bolster body comprises a pivot bolt having its long axis extending longitudinally, centrally between the fork arms, an arm extending laterally from each fork at the end thereof which is connected with the bolster body, and a removable pin connecting each of said short arms with the adjacent bolster body.

3. Vehicle body supporting running gear of the character stated in claim 1 wherein the said means for coupling the bolster body with the under side of the vehicle comprises a universal coupling substantially midway between the ends of the bolster body upon the top thereof.

4. Vehicle body supporting running gear, comprising a bolster body, means forming a universal coupling between the bolster body substantially midway between the ends thereof and the under side of the vehicle body, said bolster body being formed to provide downwardly and rearwardly extending portions extending from the coupling means and each of said portions terminating in a straight laterally extending portion, a fork at each end of the bolster body, each fork comprising two spaced parallel arms and a connecting intermediate portion, the connecting intermediate portion of each fork being positioned against the rear side of the said laterally extending portion of the bolster body, each fork having a laterally extending arm positioned against the said adjacent lateral terminal portion of the bolster body, pivot means coupling the intermediate portion of each fork with the adjacent laterally extending portion of the bolster body for the turning of the fork on an axis extending longitudinally thereof between its arms, means detachably connecting each of the lateral arms of the forks with the adjacent terminal portion of the bolster body to secure the fork against rotation, an axle extending transversely of and supported by the arms of each fork, each axle having its ends extending beyond the remote sides of the adjacent pair of forks, a wheel rotatably supported upon the outer end of each axle, and a spring supported upon each axle in a vertical plane passing between the forks and adapted for connection with the under side of the vehicle body.

5. Vehicle body supporting running gear of the character described in claim 4 wherein the supporting means for each spring comprises a sleeve encircling the axle between the fork arms, a bolster supported upon each sleeve for rocking movement on an axis perpendicular to the axis of the underlying axle, and means securing the adjacent spring to the top of the axle supported bolster.

HARRY G. SHRIVER.

REFERENCES CITED

The following references are of record in the file of this patent:

UNITED STATES PATENTS

| Number | Name | Date |
|--------|------|------|
| 1,913,698 | Clement | June 13, 1933 |
| 2,242,454 | Cochran | May 20, 1941 |
| 2,256,594 | Ingram | Sept. 23, 1941 |